Figure 3:
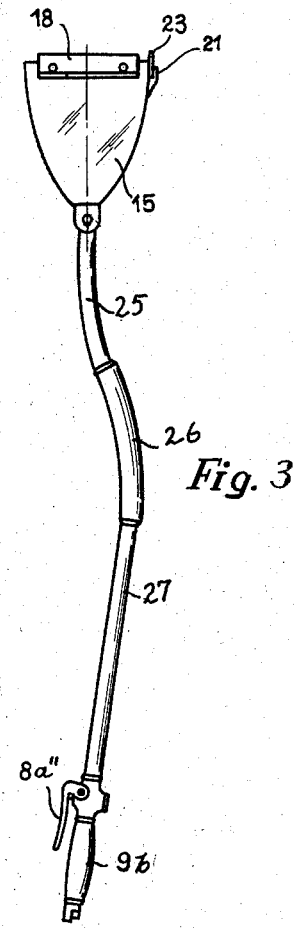

July 21, 1959  P. DASSETTO  2,895,325
SPRAYING APPARATUS
Filed March 1, 1954  2 Sheets-Sheet 1
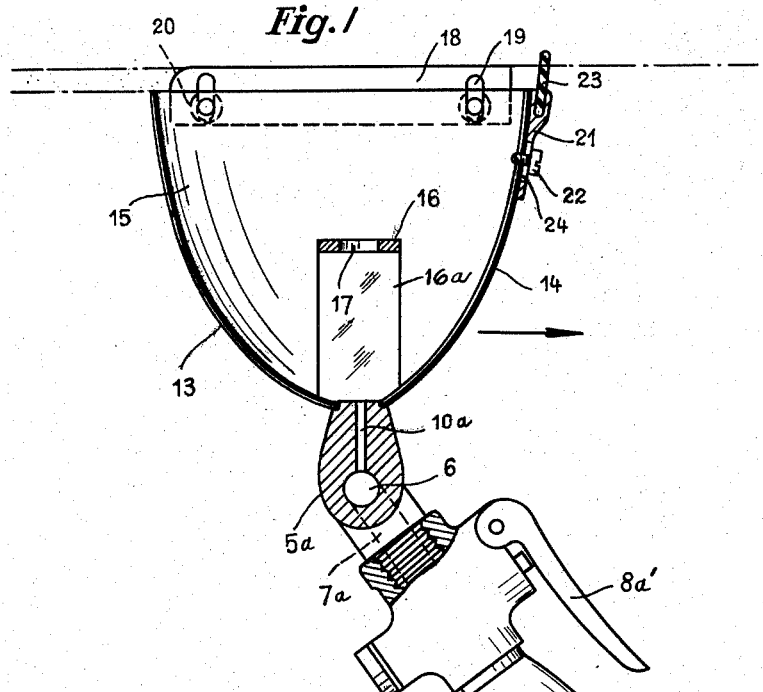
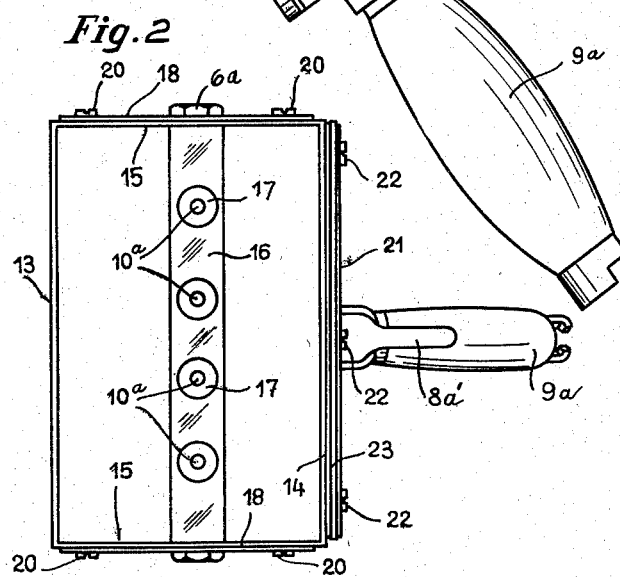

United States Patent Office 2,895,325
Patented July 21, 1959

2,895,325

SPRAYING APPARATUS

Paolo Dassetto, Brandizzo (Turin), Italy, assignor to Intonacatrice Tigre s.r.l., Turin, Italy Application March 1, 1954, Serial No. 413,396

Claims priority, application Italy March 2, 1953

6 Claims. (Cl. 72—130)

This invention relates to an apparatus for spraying mortar, cementitious material and the like.

The apparatus comprises a reservoir in the form of a portable receptacle, adapted to contain the mortar and provided with one or more nozzles for supplying compressed air at the bottom of the reservoir and one or more nozzles for the outlet of mortar from the reservoir, the first-named nozzle being in the form of holes bored in the bottom wall of the reservoir, and the outlet nozzles being coaxial with the nozzles supplying compressed air.

This invention relates to improvements in the apparatus forming the object of prior patent application Ser. No. 311,006 filed September 23, 1952, now Patent No. 2,779,626, dated January 29, 1957.

A first characteristic feature of this invention resides in the fact that the inlet nozzles for the compressed air to the reservoir and the mortar outlet nozzles from the reservoir are carried, together with the compressed air inlet conduits, and delivery conduits by the reservoir.

Further characteristic features of this invention will be understood from the following description referring to the accompanying drawings, wherein—

Figure 1 is a vertical section of an apparatus for spray coating ceilings in accordance with the invention, Figure 2 is a plan view of Figure 1, Figure 3 shows in elevation a modification of the apparatus of Figure 1.

In Figures 1 and 2 the container or receptacle containing the slurry is formed by two opposed converging forward and rear walls 13, 14, respectively, connected by flat side walls 15. A member 5a is provided at the bottom of the receptacle and has a cross hole 6 bored therethrough and carries nozzles 10a and a screw-threaded nipple 7a for fitting it to the handle 9a supporting the control lever 8a′ and compressed air supply conduit. The ends of the cross hole 6 in member 5a are closed by plugs 6a.

The central portion of the receptacle is provided with a cross wall or partition 16, suitably spaced from the nozzles 10a, having holes 17 bored therein opposite the nozzles 10a to define as many slurry spray cones. The cross wall or partition 16 has end legs 16a by means of which it is secured in any convenient manner to the side walls 15.

The top edge of the side walls 15 of the receptacle is provided with spacers 18, which may be adjusted in position by means of slots 19 and lock screws 20. At the top of the wall 14 a member 21 is vertically adjustable in vertical slots 24 and can be locked in position by means of screws 22. The member 21 carries a flexible band 23, say of rubber, adapted to seal against the ceiling to be coated.

The rear portion 13 is spaced from the ceiling by an extent determining the thickness of sprayed material forming the coating, which is thereby levelled, the side members 18 serving as guides for holding the apparatus constantly in contact with the ceiling as it is being displaced. The apparatus shown in Figs. 1 and 2 is adapted for ceiling application of mortar, plaster, and the like, and when in operation, the device is placed against the ceiling as shown in Fig. 1, the side members 18 bearing against the ceiling and being adjusted to define the desired thickness of the material being applied. The plaster or mortar is applied to the ceiling by means of compressed air entering through nozzles 10a which picks up the mass of material moving to the bottom of the receptacle defined by walls 13, 14 and 15 under the influence of gravity and propels it toward the ceiling through holes or nozzles 17 in cross wall 16. These jets of plaster then impinge upon the ceiling and define the desired coating thickness. Excess coating falls back into the receptacle and under the influence of gravity moves to the bottom of the receptacle and is again picked up by the air streams. There is, therefore, a continuous circulation of mortar or plaster within the receptacle during continuous spraying of the mortar through the forward nozzle 17 onto the ceiling. The flexible band 23 seals the forward end of the receptacle against the ceiling to confine the sprayed coating as it is applied.

In Fig. 3 the receptacle containing the slurry is carried by a long tubular member comprising a rectilinear portion 27, a curved portion 25 and a handle 26 therebetween. The handle consists preferably of a rubber sleeve and the rectilinear portion has secured to its end the grip 9b with the control lever 8a″ for the compressed air valve.

Compressed air is supplied through the tubular member 25—27 which permits easy manipulation of the apparatus by holding it with both of the operator's hands and using it also as shovel for filling it with the slurry.

The embodiment of Fig. 3 has the receptacle construction of Fig. 1 with a modified form of handle and is, like the embodiment of Fig. 1, particularly suited for ceiling application.

What I claim is:

1. An apparatus for spray coating ceilings and like surfaces with mortar, cementitious material and the like, comprising, in combination, a receptacle having an upper open end for receiving a charge of the material to be sprayed, said receptacle having a bottom and side walls, a plurality of pressure air delivery nozzles provided at the bottom of said receptacle, said nozzles being disposed in a row and equidistantly spaced from each other, a partition extending across said receptacle between opposite walls and facing the open end of said receptacle and thereby adapted to face the surface to be sprayed when the apparatus is in its operative position, said partition extending along said row of nozzles but spaced therefrom and being provided with a plurality of bores each of which is coaxial with one of said nozzles, means for delivering air under pressure to said nozzles, and means for supporting said receptacle in its operative position.

2. An apparatus as set forth in claim 1, wherein each of said shorter side walls of the container carries at its upper edge an upstanding narrow plate adjustably secured thereto and one of said longer side walls carries at its upper edge an upwardly-projecting resilient sealing lip.

3. An apparatus as defined in claim 1, wherein said means for supporting the receptacle is a handle inclined with respect to the axis of the receptacle and said means for delivering air under pressure includes a lever-operated valve connected to said handle.

4. An apparatus for spray coating ceilings and like surfaces with mortar, cementitious material and the like, comprising, in combination, a receptacle of rectangular cross section having an upper open end for receiving a charge of the material to be sprayed, said receptacle having a bottom and side walls, a plurality of pressure air delivery nozzles provided at the bottom of said receptacle, said nozzles being disposed in a row with their axes lying in a longitudinal plane of symmetry of said receptacle and being equidistantly spaced from each other, a narrow partition extending across said receptacle between opposite walls and facing the open end of said receptacle and thereby adapted to face the surface to be sprayed when the apparatus is in its operative position, said partition extending along said row of nozzles but spaced therefrom and being provided with a plurality of bores each of which is coaxial with one of said nozzles, means for delivering air under pressure to said nozzles, and means for supporting said receptacle in its operative position.

5. An apparatus for spray coating ceilings and like surfaces with mortar, cementitious material and the like, comprising, in combination, a receptacle of rectangular cross section having an upper open end for receiving a charge of the material to be sprayed, said receptacle being defined by a pair of two shorter parallel side walls and a pair of arc-shaped longer side walls joined at their lower ends to form the bottom of said container, a plurality of pressure air delivery nozzles provided at the bottom of said container, said nozzles being disposed in a row with their axes lying in a longitudinal plane of symmetry of said receptacle and being equidistantly spaced from each other, a narrow partition extending across said receptacle between said pair of opposite shorter walls of the receptacle and overlying the row of said nozzles but spaced therefrom, said partition facing the open end of said receptacle and being provided with a plurality of bores each of which is coaxial with one of said nozzles, means for delivering air under pressure to said nozzles, and means for supporting said receptacle in its operative position.

6. An apparatus as set forth in claim 5, wherein each of said shorter side walls of the container carries at its upper edge an upstanding narrow plate adjustably secured thereto and one of said longer side walls carries at its upper edge an upwardly-projecting resilient sealing lip.

References Cited in the file of this patent

UNITED STATES PATENTS

| | | |
|---|---|---|
| 1,017,533 | Goodlett | Feb. 13, 1912 |
| 1,100,565 | Higgins | June 16, 1914 |
| 1,239,075 | Bagnall | Sept. 4, 1917 |
| 1,566,325 | Hansen | Dec. 22, 1925 |
| 1,755,329 | McCormack | Apr. 22, 1930 |
| 2,305,269 | Moreland | Dec. 15, 1942 |
| 2,375,528 | De Flon | May 8, 1945 |
| 2,630,703 | Sommers | Mar. 10, 1953 |
| 2,666,323 | Ames | Jan. 19, 1954 |
| 2,779,626 | Dassetto | Jan. 29, 1957 |

FOREIGN PATENTS

| | | |
|---|---|---|
| 894,761 | Germany | Oct. 26, 1953 |
| 479,904 | Italy | Apr. 17, 1953 |